United States Patent [19]
Schwaller

[11] Patent Number: 5,857,762
[45] Date of Patent: Jan. 12, 1999

[54] BICYCLE LIGHTING SYSTEM AND GENERATOR

[76] Inventor: Edwin Schwaller, Kirchbergstrasse 68, CH-5024 Kuttigen, Switzerland

[21] Appl. No.: 522,277

[22] PCT Filed: Jan. 11, 1995

[86] PCT No.: PCT/CH95/00004

§ 371 Date: Sep. 11, 1995

§ 102(e) Date: Sep. 11, 1995

[87] PCT Pub. No.: WO95/18739

PCT Pub. Date: Jul. 13, 1995

[30] Foreign Application Priority Data

Jan. 11, 1994 [CH] Switzerland .......................... 00074/94

[51] Int. Cl.$^6$ ........................................................ B62J 6/00
[52] U.S. Cl. ............................ 362/72; 362/192; 362/183; 310/156
[58] Field of Search ................................ 362/72, 78, 192, 362/183, 193; 340/815.64, 815.71, 432, 480; 310/67 A, 172, 67 R, 156, 254, 168, 171; 315/78, 79

[56] References Cited

U.S. PATENT DOCUMENTS

| | | | |
|---|---|---|---|
| 2,722,617 | 11/1955 | Cluwen et al. | 310/266 |
| 3,629,626 | 12/1971 | Abbott | 310/266 |
| 3,884,317 | 5/1975 | Kinzel | 310/67 A |
| 3,969,649 | 7/1976 | Jacob | 362/192 |
| 3,971,977 | 7/1976 | Hirt et al. | 362/192 |
| 5,247,430 | 9/1993 | Schwaller | 362/183 |
| 5,268,602 | 12/1993 | Schwaller | 310/67 A |
| 5,554,903 | 9/1996 | Takara | 310/266 |
| 5,583,561 | 12/1996 | Lahos | 362/192 |

FOREIGN PATENT DOCUMENTS

| | | |
|---|---|---|
| 460 585 | 12/1991 | European Pat. Off. . |
| 528 347 | 2/1993 | European Pat. Off. . |
| 2 464 175 | 3/1981 | France . |
| 92 06 609 | 10/1992 | Germany . |
| 2 126 438 | 3/1984 | United Kingdom . |
| 2 161 040 | 1/1986 | United Kingdom . |
| 81 01274 | 5/1981 | WIPO . |

OTHER PUBLICATIONS

R. Lievin, "Safety Lighting Apparatus for Bicycles", French Patent Application No. 79 21716, dated Mar. 6, 1981, under Publication No. 2 464 175.

W. Hurzeler, "Bicycle Lighting", German Patent Application No. 92 06 609.7, dated Nov. 1, 1992.

International Search Report dated Apr. 7, 1995.

English translation of International Search Report dated Apr. 7, 1995.

*Primary Examiner*—Thomas M. Sember
*Attorney, Agent, or Firm*—Ratner & Prestia

[57] ABSTRACT

A bicycle lighting system comprising a dynamo generator, integrated rechargeable batteries and an integrated electronic circuitry, the bicycle being an exemplary embodiment of pedal-driven vehicles provided with standard front and rear lamps. Hitherto known systems operate with conventional dynamos having an efficiency far too low to provide power to energize lamps and simultaneously charge batteries at speeds below 15 kmph. The inventive generator is constructed such that a rotating magnetic-circuit arrangement with a stationary air-core coil and specially defined pole shoes achieve 90% efficiency. At 5 to 7 kmph, at least 4 W energy is available for energizing lamps and rapidly charging batteries. From standstill to approximately 5 kmph, the batteries energize the lamps. The electronic circuitry comprises a converter having a special voltage set-up and voltage set-down function such that for a determinate output voltage, the input voltage can be lesser than, equal to or greater than the determinate output voltage. Above 5 kmph, energy apportioning for energizing lamps and simultaneously charging batteries in ratios of 1–2:1 is rendered possible.

30 Claims, 9 Drawing Sheets

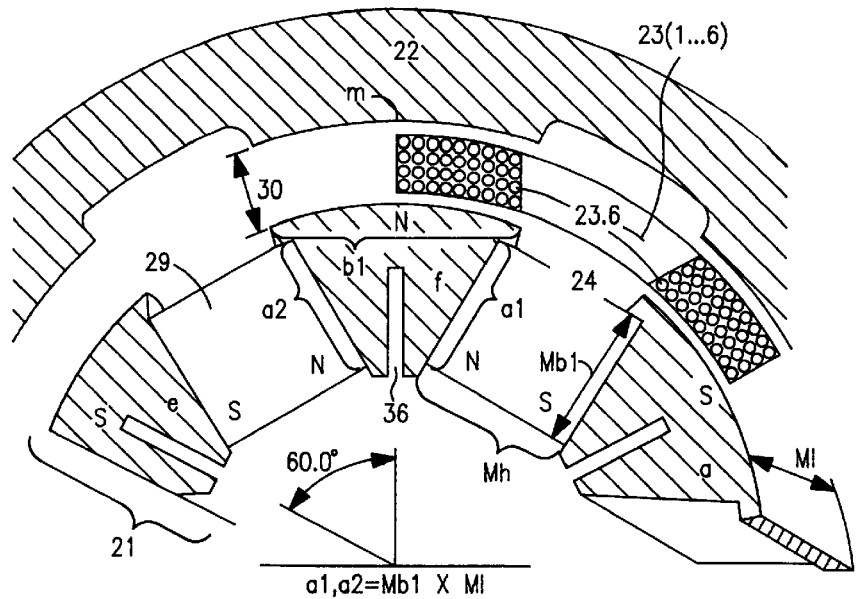
FIG. IA
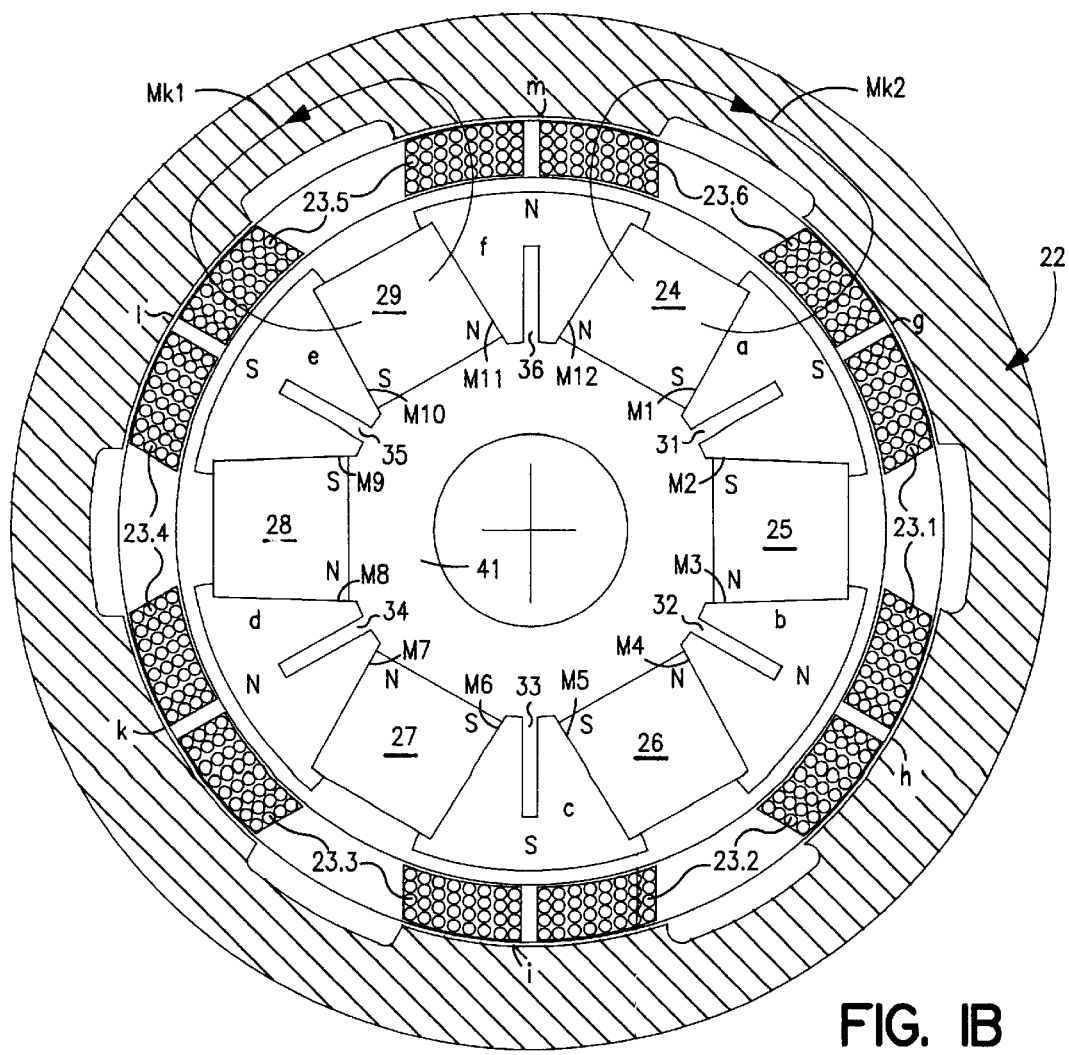
FIG. IB

BICYCLE LIGHTING SYSTEM AND GENERATOR

BACKGROUND OF THE INVENTION

The present invention relates to a bicycle lighting system comprising a dynamo system drivable by a ridden bicycle and mounted thereupon, at least one front light or headlamp and at least one rear light or tail lamp, both of which are supplied with electric power from the dynamo system, and an electronic circuitry which converts the electric power produced by the dynamo system into a regulated direct-current voltage for the purpose of generating light and charging an accumulator or storage battery. The invention also relates to a new and improved generator for general applications, particularly however for use as a bicycle dynamo generator.

Conventional and marketable bicycle lighting systems have to comply, with respect to the electric power and voltage, with the Standards determined by law. At a traveling speed of 15 kilometers per hour and beyond that, these Standards specify a maximum voltage of 7 V for the dynamo output voltage applied to the lamps. In accordance with legal regulations, the minimum value of the output voltage of the dynamo lies between 3 V at 5 kmph and 5.8 V at 15 kmph and—as indicated in FIG. 5a of the annexed drawings—must not fall short of 5.8 V at a speed beyond or better than 15 kmph. On the basis of the aforementioned regulations, present-day or state-of-the-art dynamos allow producing merely 1.4 W power at a bicycle traveling speed of 5 to 6 kmph. If such power or output of present-day conventional dynamos is increased, it would be physically impossible to meet or observe the legally specified maximum voltage of 7 V at 15 kmph or beyond such speed. Only by taking respective load measures would it be possible to prevent exceeding the legally specified maximum value. As a result, the power dissipation or loss would greatly increase and the efficiency would then considerably decrease.

Therefore, conventional bicycle lighting systems cannot be additionally loaded in the lower speed range for the purpose of charging a rechargeable accumulator battery. Only from a traveling speed of approximately 15 kmph, conventional dynamos will generate sufficient power that could be used for charging the rechargeable accumulator battery, the efficiency of these known systems being extremely low when the traveling speed is below the aforementioned speed of 15 kmph. Laterally mounted dynamos have an efficiency of approximately 17% to 24%, roller dynamos can achieve an efficiency of 30% to 35% at the most, and the efficiency of hub dynamos is approximately 40%. When the traveling speed of the bicycle exceeds 15 kmph, the efficiency additionally decreases because of the power draw or consumption while charging the accumulator battery. Under such circumstances, the bicycle rider is obliged to expend additional physical energy for actuating the dynamo.

Those skilled in the art have criticized the aforementioned limitations and drawbacks of prior-art constructions and have realized that conventional dynamos and bicycle lighting systems do not correspond at all with the state of present-day engineering knowledge.

SUMMARY OF THE INVENTION

Therefore, with the foregoing in mind, it is a primary object of the present invention to provide a new and improved construction of a bicycle lighting system in combination with a generator, which system is adapted to the latest state of advanced engineering and technology and accommodated to present-day requirements.

Another significant object of the present invention is directed to the provision of a new and improved bicycle lighting system which is relatively simple in construction and design and, particularly, economical to manufacture.

Yet a further significant object of the present invention is concerned with a new and improved dynamo system, which—with regard to construction, power efficiency and production cost thereof—meets all requirements of the bicycle lighting system of the present invention.

The implementation of these and further objects of the present invention is based on the finding and conclusion that a satisfactory bicycle lighting system can only be realized by means of a dynamo generator having an efficiency considerably higher than that of conventional dynamos.

The bicycle lighting system of the present development is characterized in that the dynamo system is provided with a dynamo generator comprising an inner circuit and an outer circuit, both of which are mounted for synchronous rotation in the same direction about a stationary air-core coil consisting of coil sections, whereby the inner circuit and the outer circuit each comprise n poles in identical pole pitch, so that from a minimum traveling speed of approximately 5 to 7 kmph the power output of the dynamo system is adequately high for rapid charging of the rechargeable accumulator battery and to simultaneously enable the energization of the bicycle lamps at a high illumination level, and in that the electronic circuitry comprises a converter having a set-up and set-down mode of operation such that—for a determinate stabilized output voltage—the fed input voltage can be lower than, equal to or higher than said output voltage, whereby the converter is additionally supplied from the rechargeable accumulator battery as long as the traveling speed falls short of said minimum traveling speed of about 5 to 7 kmph.

In order to ensure the required characteristic features and properties of the dynamo system, the generator has a high efficiency and a very low coil internal resistance, so that at the minimum traveling speed the output is at least 4.5 W at a relatively low output voltage. The output of the dynamo generator is thereby converted into an output voltage of 6.2 V to 7 V.

The inner circuit comprises n (preferably six by way of example) inner pole shoes, and at each inner pole shoe there are laterally arranged two magnetic poles in homopolar configuration. In this manner, the two magnetic surfaces project themselves upon the pole-shoe surface. Since the two magnetic surfaces are preferably far larger than the pole-shoe surface, the density of the magnetic flux correspondingly increases toward the pole-shoe surface. This arrangement is advantageous in that these inner pole shoes possess a relatively small mass and thereby render possible a substantial weight reduction.

The outer circuit comprises n (preferably six by way of example) outer pole shoes which are oppositely arranged relative to the n inner pole shoes and nose-shapedly projecting toward the latter, these outer pole shoes being structured such that each air gap between the inner pole shoes and the respective outer pole shoes assigned to the latter is the shortest path for the magnetic flux. In this manner, the magnetic leakage flux is advantageously reduced.

In order to reduce the mutual interference of the two homopolar magnets laterally lying against their respective inner pole shoe, each inner pole shoe is divided in the middle or mid-portion thereof into two identical parts by a slot providing an air gap extending in the radial direction. This arrangement results in the additional advantage of a smaller pole-shoe volume as well as larger magnet heights or, in other words, two half magnet-lengths per pole together with the smallest magnet-volume and double magnet-surface are possible.

The air gap in the inner pole shoes reduces the mutual interference of the two homopolar magnet faces because the magnetic flux glides in each case with respective halves over the pole shoe to the outer circuit. The two magnetic fluxes in each inner pole shoe possess an optimally short magnetic circuit path, so that there results an optimal magnetic flux. A further advantage is seen in the fact that an extremely small generator with very high flux densities can be produced, such generator having at the same time a light-weight, small magnet-volume and high-efficiency structure. The efficiency achievable by means of the new and improved generator provided for the bicycle lighting system constructed according to the present invention is at least approximately 90%.

In a preferred embodiment of the dynamo system according to the present invention, the converter of the electronic circuitry comprises a voltage-converting and energy-limiting device for converting the input voltage into a determinate stabilized output voltage and for limiting the converted energy to a determinate maximum power output. The electronic circuitry further comprises a threshold-value device which detects a rectified and smoothed output voltage, whereby in case the threshold-value device detects that a determinate minimum voltage of the dynamo generator is exceeded, the voltage supplied from the accumulator battery is fed by means of an electronic switchgear—in addition to the rectified and smoothed dynamo output voltage—to the voltage-converting and energy-limiting device. During battery operation, the output voltage of the voltage-converting and energy-limiting device lies within a first constant output voltage range. During dynamo operation, the output voltage of the voltage-converting and energy-limiting device lies within a second constant output voltage range, the latter lying above the first constant output voltage range. The electronic circuitry further comprises a battery charging device which is activated above an output charging voltage lying between the first constant output voltage range and the second constant output voltage range.

The first constant output voltage range of the electronic circuitry preferably lies within a fixedly set range from 4.5 V to 6 V. During this mode of operation, the input voltage range of the converter lies between 0.8 V minimum threshold-value voltage and a maximum switch-over voltage of 4.8 V.

The second constant output voltage range of the electronic circuitry preferably lies within a range between 6.2 V and 7 V, but lies preferably above 6.4 V. During this mode of operation, the input voltage range of the converter lies between approximately 5 V in an initial speed range and a maximum voltage level of 80 V at a speed of about 80 kmph. By virtue of this setting of the electronic circuitry in accordance with the teachings of the present invention, the legal requirements and Standards are ideally met at each and every bicycle traveling speed. The combination of a powerful high-efficiency dynamo generator with the electronic circuitry and the rechargeable accumulator battery renders possible a combined travel-light, battery-charging and standstill-light system. The electronic circuitry is operated by the battery as well as directly by the dynamo generator.

The voltage-converting and energy-limiting device preferably limits the output power of the electronic circuitry invariably between 4 W and 6 W, advantageously between 4.5 W and 5 W. In this manner, the short-circuit safety of the accumulator battery and of the dynamo generator as well as of the entire dynamo system is ensured.

According to a particularly preferred embodiment of the present invention, the electronic circuitry further comprises (a) a rectifier circuit for the purpose of producing the aforesaid rectified and smoothed dynamo output voltage which is supplied to the voltage-converting and energy-limiting device, (b) a first voltage divider network for the purpose of converting a first rectified and speed-proportional output voltage of the dynamo generator into a first component voltage and applying such first component voltage to a first threshold-value switch corresponding with the aforementioned threshold-value device, (c) a second voltage divider network for the purpose of converting the rectified and speed-proportional output voltage of the dynamo generator into a second component voltage and applying such second component voltage to a second threshold-value switch, whereby the first threshold-value switch applies the battery voltage to the voltage-converting and energy-limiting device by means of said electronic switchgear when the rectified output voltage supplied from the dynamo generator exceeds a first threshold voltage corresponding with said determinate minimum voltage and detected by the first threshold-value switch, and whereby the second threshold-value switch transmits to the voltage-converting and energy-limiting device a signal for switching over the output voltage of the latter from the first stabilized output voltage to the second stabilized output voltage, and vice versa, whenever the second threshold-value switch detects that a second threshold voltage is not reached or is exceeded, (d) a delay circuit connected to the output of the first threshold-value switch as well as to the electronic switchgear and which—in case the rectified and smoothed output voltage of the dynamo generator falls short of the first threshold voltage—opens the electronic switchgear at the end of a predetermined period of time, e.g. four minutes, for the purpose of switching off the voltage of the accumulator battery from the input of the voltage-converting and energy-limiting device, and (e) the aforementioned battery charging device which is output coupled to the voltage-converting and energy-limiting device and which—also in the case of battery operation—remains activated for charging the battery.

The first threshold-value switch switches on, by means of the electronic switchgear, the battery voltage at a threshold voltage of approximately 0.8 V. The battery charging device operates at an output voltage of 6.1 V up to maximum 7 V, such output voltage proportionally increasing with higher power conversion depending on the charging condition of the battery.

By way of example, the thereby resulting effective or actual efficiency of the entire bicycle lighting system constructed according to the invention for 3 W luminous power and 1 W battery charging energy is—with reference to 3 W—approximately 60% in the case of a discharged accumulator battery and approximately 80% in the case of a charged accumulator battery.

As alluded to above, the invention is not only concerned with the bicycle lighting system, but also relates to the new and improved construction of the generator. Those skilled in the art will readily understand that the underlying principles and concepts of the dynamo generator can be also employed for other generator applications.

The inventive generator with a coil arrangement and a thereto movable arrangement with magnets is manifested, among other things, by the features that the movable arrangement comprises an inner circuit and an outer circuit, both of which are mounted for synchronous rotation in the same direction about a stationary air-core coil consisting of coil sections, whereby the inner circuit and the outer circuit each comprise n poles in identical pole pitch.

Advantageously, the inner circuit comprises n inner pole shoes, whereby at each of these inner pole shoes there are laterally arranged two magnetic poles in homopolar configuration, and the outer circuit comprises n outer pole shoes which lie opposite to the inner pole shoes and which nose-shapedly project to the latter, the outer pole shoes being structured such, that each air gap between the inner pole shoes and the respective outer pole shoes is the shortest path for the magnetic flux.

Preferably, each inner pole shoe of the inner circuit comprises in the centric portion thereof a slot extending in radial direction and forming an air gap in order to reduce mutual interference of the respective two magnets laterally lying upon the related inner pole shoe. Furthermore, the sum of the two magnet surfaces adjacent to the related inner pole shoe is larger than the peripheral surface of said related inner pole shoe.

The air-core coil is divided per pole field into two identical coil sections pole-correctly connected in series.

Those skilled in the art will readily understand that the characteristics of the magnet arrangement and of the magnetic circuit structure can be advantageously applied to and used for electric motors, for instance, servomotors.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of these drawings, there have been generally used the same reference characters to denote the same or analogous components and wherein:

FIG. 1a is an enlarged detail showing of a part of a cross-sectional view of a dynamo generator illustrated in FIG. 1b;

FIG. 1b shows a cross-sectional view of a preferred exemplary embodiment of the dynamo generator constructed in accordance with the present invention;

FIG. 5a depicts operation with a discharged or defective accumulator battery and FIG. 5c refers to operation with a normal functioning accumulator battery;

DETAILED DESCRIPTION OF THE PREFERRED EMBODIMENTS

Figure 2A:
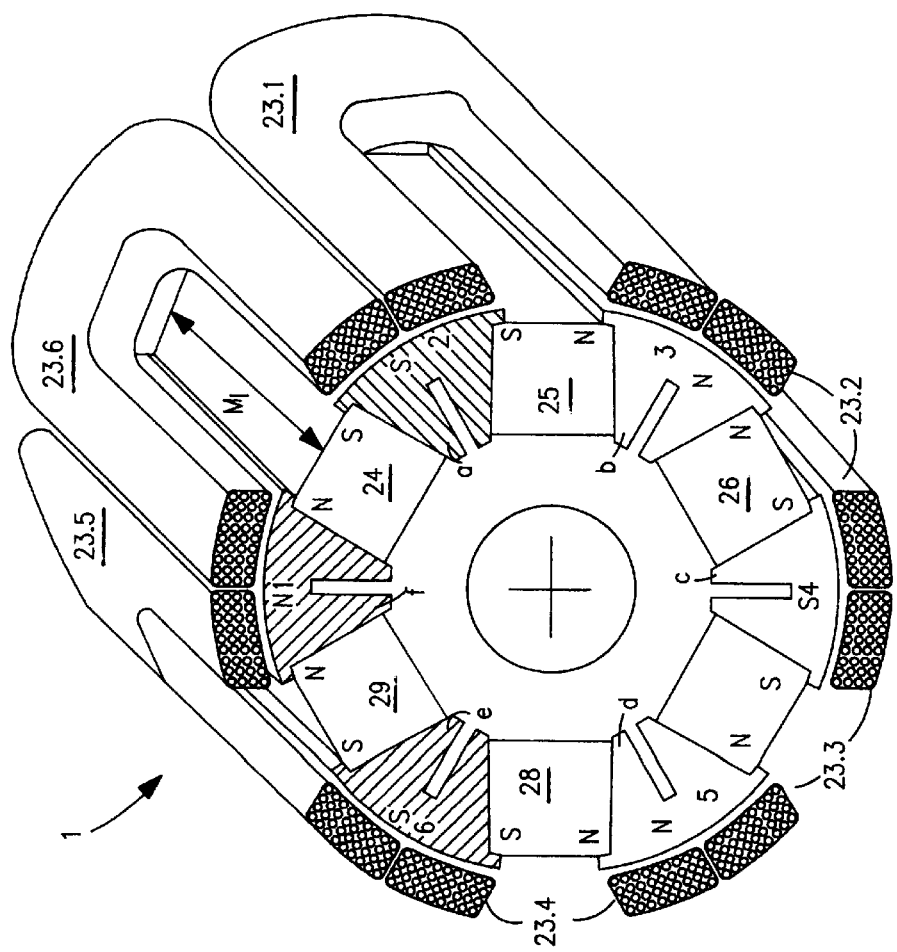
FIG. 2a shows the inner magnetic circuit arrangement in a perspective cross-sectional illustration.

Describing now the drawings, it is to be understood that to simplify the showing thereof, only enough of the construction of the exemplary embodiment of the bicycle lighting system and generator has been illustrated therein as is needed to enable one skilled in the art to readily understand the underlying principles and concepts of this invention.

Turning attention now specifically to FIGS. 1a and 1b of the drawings, a dynamo generator 1 illustrated therein by way of example and not limitation will be seen to comprise in concentric arrangement from the center to the circumference a rotating inner circuit 21, a stationary air-core coil 23 and an outer circuit 22 synchronously rotating with the inner circuit 21. In the exemplary embodiment depicted in FIGS. 1a and 1b, the inner circuit 21 and the outer circuit 22 each comprise six poles in identical pole pitch, the poles of the inner circuit 21 thereby facing the respective poles of the outer circuit 22, so that the resulting pole-pitch angle is 60°. The six poles of the inner circuit 21 are structured in the form of six pole shoes a, b, c, d, e and f, while the poles of the outer circuit 22 are structured in the form of likewise six pole shoes g, h, i, k, l and m which are situated opposite to the pole shoes a–f and which nose-shapedly project toward the latter, so that a smallest possible air gap 30 is formed. The pole shoes a–f of the inner circuit 21 are made of soft iron, while the carrier or support of the inner magnetic circuit is itself non-ferrous. The outer circuit 22 consists entirely of soft iron. The number of poles, namely six, is specified only by way of a preferred example.

Between the six pole shoes a–f of the inner circuit 21 there are arranged six permanent magnets 24–29 in such a manner that in each case they rest homopolar against both sides of each pole shoe. The result is that the two magnet surfaces, which in Fig. 1a are designated by reference characters $a_1$ and $a_2$ (magnet width) at the respective magnets 24 and 29, project themselves upon a pole-shoe surface $b_1$ of the respective pole shoe f. The magnet lengths $M_1$ (refer to FIG. 2a) of the permanent magnets 24–29 extending perpendicularly with respect to the illustration in FIGS. 1a and 1b and the entire arrangement are determined such, that in each case the sum of the respective magnet surfaces $a_1$ and $a_2$ is far larger than the respective pole-shoe surface $b_1$. In this manner, the magnetic-flux density correspondingly increases toward the pole-shoe surface $b_1$. This arrangement is furthermore advantageous in that the six pole shoes a–f of the inner circuit 21 possess a relatively small mass, so that a substantial weight reduction is rendered possible.

However, the entire rotating part of the dynamo generator 1 possesses, mainly because of the rotating outer circuit 22, a relatively high moment of inertia, so that the wheel slippage behavior is substantially improved.

The magnetic flux from the pole shoes a–f of the inner circuit 21 is divided across the respective nose-shapedly projecting pole shoes g–m of the outer circuit 22 into two parts or portions as illustrated in FIG. 1b and designated by the reference characters MK1 and MK2. By virtue of the nose-shaped form of the pole shoes g–m of the outer circuit 22, such form being also adapted to the periphery of the coil, there results the air gap 30—indicated between a pole-shoe pair, namely the pole shoes f and m in FIG. 1a—as the shortest path for the magnetic flux. The magnetic leakage flux is thus reduced.

In order to reduce interaction of the homopolar magnets 24–29 resting against both sides of the respective pole shoes a–f of the inner circuit 21, these pole shoes a–f are provided each with a slot in the mid-portion thereof, such slots forming radial air gaps 31–36. The advantage of this arrangement is seen in a small pole-shoe volume in view of coincident large magnet heights. i.e. two magnet widths per pole with coincidentally the smallest magnet volume and the double magnet-surface.

The radial gaps 31–36 provided in the pole shoes a–f prevent interaction of the two homopolar magnet-face surfaces, since the magnetic flux flows in halves through the respective pole shoe of the inner circuit 21 to the respective pole shoe of the outer circuit 22. The two magnetic-flux halves in each of the pole shoes a–f have an optimally short magnetic circuit path MK1 and MK2 depicted in FIG. 1b. The result is an optimal magnetic flux. A further advantage is that, in this manner, a relatively small dynamo generator 1 with extremely high flux density, low weight, small magnet volume, homogeneous magnetic loading and a very high efficiency can be realized.

Figure 2B:
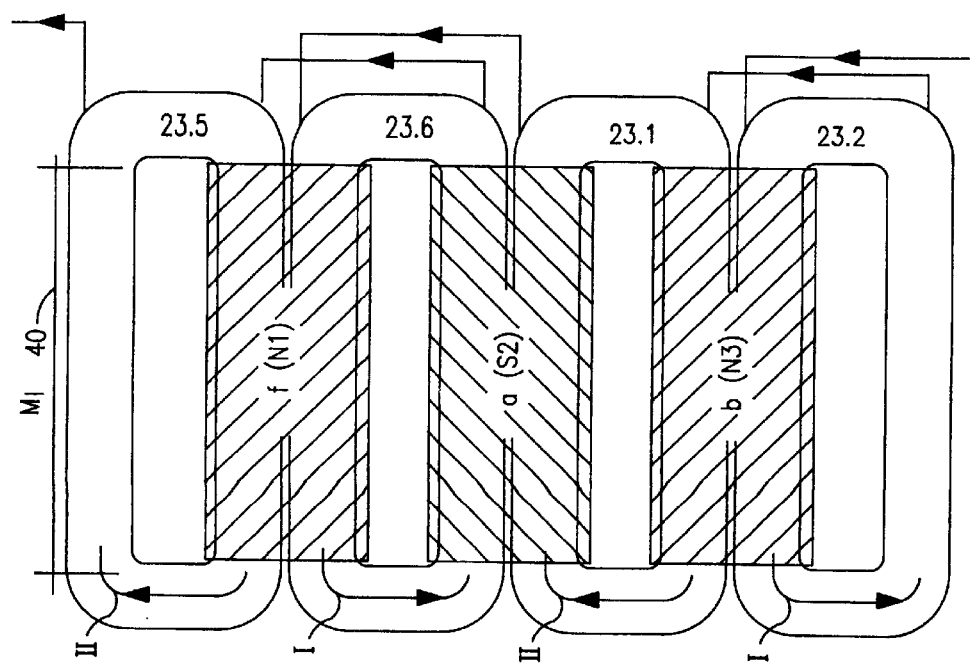
FIG. 2b shows the arrangment of the stationary coil in a stretched illustration of the coil arrangement.

FIG. 2a illustrates the inner magnetic circuit as well as the coil arrangement of the preferred embodiment of the dynamo generator 1 in a perspective cross-sectional view. In FIG. 2b there is shown in a stretched or unfolded arrangement a segment of the wire-wound coil in the sequence 23.2, 23.1, 23.6 and 23.5, which together with the pole shoes b, a, f and e form pole fields N3, S2 and N1. The coil connections and two winding directions I and II of the coil sections 23.2, 23.1, 23.6 and 23.5 are schematically indicated in FIG. 2b.

Since normally one coil is guided over two heteropolar poles, three coils are required for a six-polar arrangement not particularly illustrated in the drawings. In this manner, the stationary air-core coil arrangement 23, generally represented by reference character 23(1 . . . 6) in FIG. 1a, is divided per pole field into two identical coil sections, so that there are six coil sections 23.1–23.6 pole-correctly connected in series. There is thus achieved a substantially smaller overall height. As depicted in FIGS. 1a and 1b, there are provided six coil sections 23.1–23.6 mutually arranged at an angular pitch of 60°.

In order to fabricate the firm stationary air-core coil or coil arrangement 23, the windings consisting of backlack copper wire are wound in self-contained manner and bent onto the reference circle of the air-core coil arrangement. The coils are inserted in a suitable plastic injection molding die. The mutual coil connections are already connected and mounted at a connection pin plug shown, for instance, in FIG. 7 and designated by reference character 39. The plastic injection molding die includes at the same time a housing base or bottom shown, for instance, in FIG. 7 and designated by reference character 37. Subsequently, the whole unit is injection molded with plastic material to form a leadless plug-in component. This type of construction renders possible that the electronic part can be plugged in directly at the housing bottom of the dynamo system. A further wiring is thus unnecessary. The wires of the stationary air-core coil have been previously processed and require no subsequent treatment or refinishing.

The process described hereinbefore renders possible a stationary air-core coil 23 comprising a very low inductance, i.e. preferably lower than 150 $\mu$H. In this manner, there is produced a negligible counter inductance by which the pole sensitivity is hardly or not at all noticeable. The coil resistance is preferably smaller than 1.6 ohms whereby—in the case of an actually accomplished construction of the dynamo generator 1—a resulting magnetic loading was larger than 0.6 T. In this realized construction the average coil diameter was 31 mm, the magnet length 30 mm and the outer diameter approximately 44 mm. The present invention aims at providing a shorter coil length of approximately 20 mm. Such coil length has been designated by reference character 40 in FIG. 2b as well as in FIG. 7. By virtue of this shorter coil length it is possible to also improve the essential inventive energy and power characteristics of the dynamo generator 1 constructed in accordance with the invention.

Figure 3:
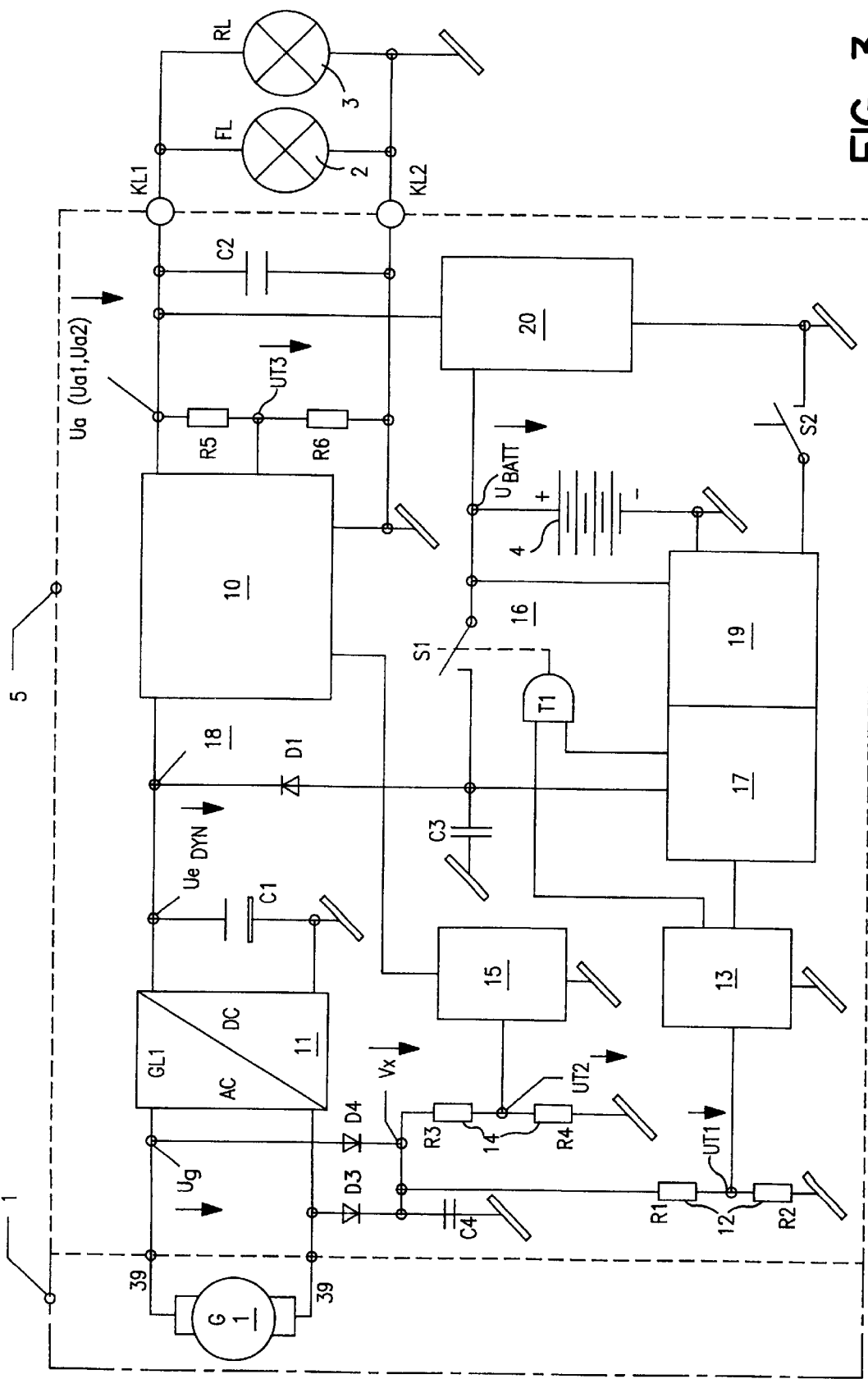
FIG. 3 schematically shows a block diagram of a preferred exemplary embodiment of the bicycle lighting system constructed according to the present invention whereby, in particular, the role of the proposed electronic circuitry becomes apparent.

Having now had the benefit of the foregoing description of the dynamo generator 1 as considered with respect to FIGS. 1a, 1b, 2a and 2b, the construction and the mode of operation of the entire bicycle lighting system and particularly of a preferred embodiment of an electronic circuitry 5 will be now explained by referring to FIGS. 3, 4 and 5.

FIG. 3 illustrates a block diagram of the electronic circuitry 5 of a preferred exemplary embodiment of the bicycle lighting system constructed in accordance with the invention. The electric alternating voltage produced by the dynamo generator 1 constructed in the foregoing described manner is rectified by a rectifier 11 and smoothed by a capacitor $C_1$. At a circuit node 18 there is formed the sum of a rectified dynamo voltage $U_{eDYN}$ and a battery voltage $U_{BATT}$ as will be hereinafter described. The combined voltage $U_{eDYN}$ and $U_{BATT}$ produced at the circuit node 18 is applied to the input side of a voltage-converting and energy-limiting device 10 which converts this voltage (power) to 6 V and 6.4 V, respectively. This voltage-converting and energy-limiting device 10 possesses the characteristic feature of optimally adapting itself to the internal resistance of the dynamo generator 1. In the case of a low input voltage due to a low traveling speed, the voltage-converting and energy-limiting device 10 sets up the resulting voltage (power). In the case of a higher traveling speed and thus of a high output voltage and output power of the dynamo generator 1, the voltage-converting and energy-limiting device 10 sets down the voltage available at the circuit node 18 to preferably 6.4 V at an output side $U_a$ and keeps this voltage substantially constant or stabilized with a variation range of approximately ±10 mV. By virtue of the provision and application of electronic components representing the latest state of the art, such as Schottky diodes and power FETs (field effect transistors), there can be achieved an efficiency of 85% and even better for the voltage-converting and energy-limiting device 10. This efficiency is about 85% in the case of low voltages, but can lie above 90% when there are relatively high input voltages, e.g. about 9 V, at the circuit node 18.

The overall functioning and performance of the electronic circuitry 5 will be better understood when consideration is now given to the function and mode of operation of a first threshold-value switch 13, a second threshold-value switch 15, as well as a delay circuit 17 and a battery monitoring circuit 19.

FIRST THRESHOLD-VALUE SWITCH 13

The output voltage of the dynamo generator 1 is rectified by means of a rectifier consisting of two diodes $D_3$ and $D_4$ and smoothed by a capacitor $C_4$. This voltage $V_x$ is proportional to the traveling speed. It is divided by means of a first voltage divider 12, which consists of two resistors $R_1$ and $R_2$, and applied as voltage $U_{T1}$ to the input of the first threshold-value switch 13. This first threshold-value switch 13 activates a gate circuit $T_1$ at an input voltage higher than $V_x=0.8$ V. This means that, by means of the gate circuit $T_1$, the voltage of an accumulator battery 4 is supplied to the summing circuit node 18 by means of a switch $S_1$ of an electronic switchgear 16 and via a protective diode $D_1$. A further output of the first threshold-value switch 13 sets the delay circuit 17 to zero (static).

If the input voltage at the first threshold-value switch 13 is lower than $V_x=0.8$ V, the delay circuit 17 is started. The latter comprises an oscillator and counting chains which are here not particularly illustrated. The battery voltage remains available at the summing circuit node 18 by means of the gate circuit $t_1$, the electronic switchgear 16 and the protective diode $D_1$ until the output of the delay circuit 17 opens the electronic switchgear 16 by means of the gate circuit $T_1$. The battery voltage is then cut off. The gate circuit $T_1$ is thus activated with the first threshold-value switch 13 and moves up with the start of the delay circuit 17. In case the rechargeable accumulator battery 4 is completely discharged or defective or non-existent, the activation at the circuit node 18 will be prevented by means of the battery monitoring circuit 19.

SECOND THRESHOLD-VALUE SWITCH 15

The speed-proportional voltage $V_x$ of the dynamo generator 1 resulting at the capacitor $C_4$ is supplied via a second voltage divider 14, which consists of two resistors $R_3$ and $R_4$, to the second threshold-value switch 15. The resulting input voltage is designated by reference character $U_{T2}$. The second threshold-value switch 15 activates by means of an output signal the voltage-converting and energy-limiting device at a dynamo-generator output voltage lower than 4.5 V at $V_x$, whereby an output voltage of the voltage-converting and energy-limiting device 10 of (adjustable) 4.5 V to 6 V ($U_{a1}$) is reached. If the output voltage of the dynamo generator 1 is above 4.8 V, the voltage-converting and energy-limiting device 10 is set by means of the output signal of the second threshold-value switch 15 in such a manner, that the voltage-converting and energy-limiting device 10 produces 6.4 V ($U_{a2}$) at the output thereof. This implies that, by virtue of the function and mode of operation of the preferred exemplary embodiment of the electronic circuitry 5 depicted in FIG. 3, at an input voltage $U_{T2}$ of the second threshold-value switch 15 when $V_x$ of the latter is lower than 4.5 V, voltage is procured from the battery 4 for the purpose of producing standstill, position or parking light, and that at an input voltage $U_{T2}$ of the second threshold-value switch 15 when $V_x$ is higher than 4.8 V, output voltage, i.e. traveling voltage is procured from the dynamo generator 1. Change-over from battery operation to dynamo operation occurs smoothly.

To the output of the voltage-converting and energy-limiting device 10 there is connected a battery charging device 20 which feeds the accumulator battery 4 as soon as the output voltage $U_a$ exceeds 6.1 V and rises to 6.4 V by proportionally increasing in dependence on the charge condition of the accumulator battery 4. It is thereby ensured that no battery charging occurs during battery standstill-light operation. It is furthermore ensured that the voltage does not fall below 6 V when the energy of the dynamo generator 1 is insufficient.

At the output of the voltage-converting and energy-limiting device 10 there is connected a resistance voltage divider $R_5$, $R_6$ which supplies a control signal $U_{T3}$ for the control of the output voltage $U_a$ (feedback). This control voltage is influenced by the second threshold-value switch 15.

The functioning and mode of operation of the electronic circuitry 5 schematically illustrated in FIG. 3 will be discussed more fully hereinafter, particularly in conjunction with the description of FIGS. 4a to 4e and FIGS. 5a to 5c.

Figure 4A:
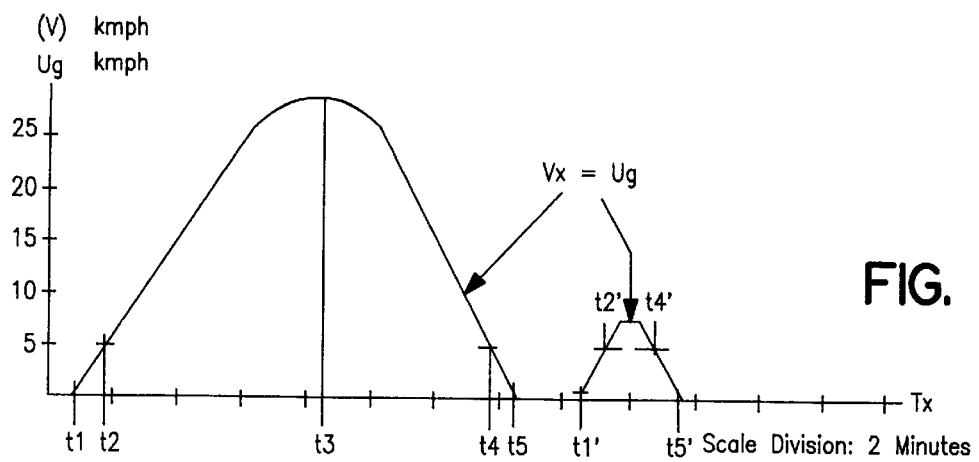
FIG. 4a shows a voltage+speed/variation-in-time diagram.
Figure 4B:
FIGS. 4b, 4c, 4d and 4e depict voltage/time diagrams for the purpose of explaining the function of the bicycle lighting system according to the present invention.
Figure 4C:
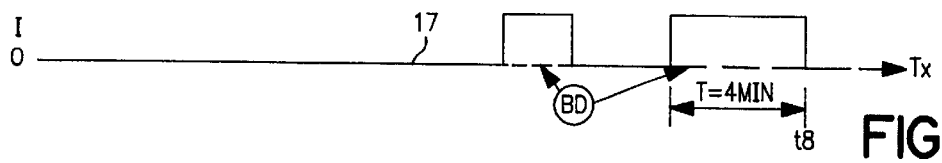

FIGS. 4a to 4e schematically show in graphical representation the chronological dependence of the voltages $U_g$ (approx. $V_x$), $U_{T1}$ and $U_{T2}$ (a component voltage of the voltage $V_x$), which are respectively produced by the first voltage divider 12 and the second voltage divider 14 and which are applied to the first threshold-value switch 13 and the second threshold-value switch 15, respectively. The approximately linear and speed-proportional dependence of these voltages is thereby assumed such that they rise from zero starting at a moment of time t1(t1') up to a moment of time t3(t3') in accordance with an assumed increase in speed from zero to 30 kmph, and then again drop approximately linearly from t3(t3') to a moment of time t5(t5'). At the moment of time t1(t1'), at which the component voltage $U_{T1}$ is reached at $V_x=0.8$ V, the first threshold-value switch 13 is activated, and at the moment of time t5(t5') at which the aforementioned voltage $U_{T1}$ falls short at $V_x=0.8$ V, the first threshold-value switch 13 is deactivated (start and travel operation). Between the moments of time t1(t1') and t5(t5') the delay circuit remains inactive. At the moment of time t5(t5') the delay circuit 17 starts measuring the delay of, for example, four minutes, which is terminated at a moment of time t8 as depicted in FIG. 4c, and opens the electronic switchgear 16 by means of the gate circuit $T_1$ and thereby cuts off the battery voltage. If the dynamo voltage rises prior to the end of the delay time (for instance four minutes) t5–t1'as depicted in FIG. 4a, the delay circuit 17 is made inactive by the first threshold-value switch 13 and the functions recommence as at the moment of time t1(t1').

Figure 4D:
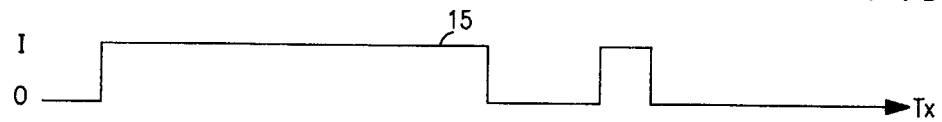
Figure 4E:
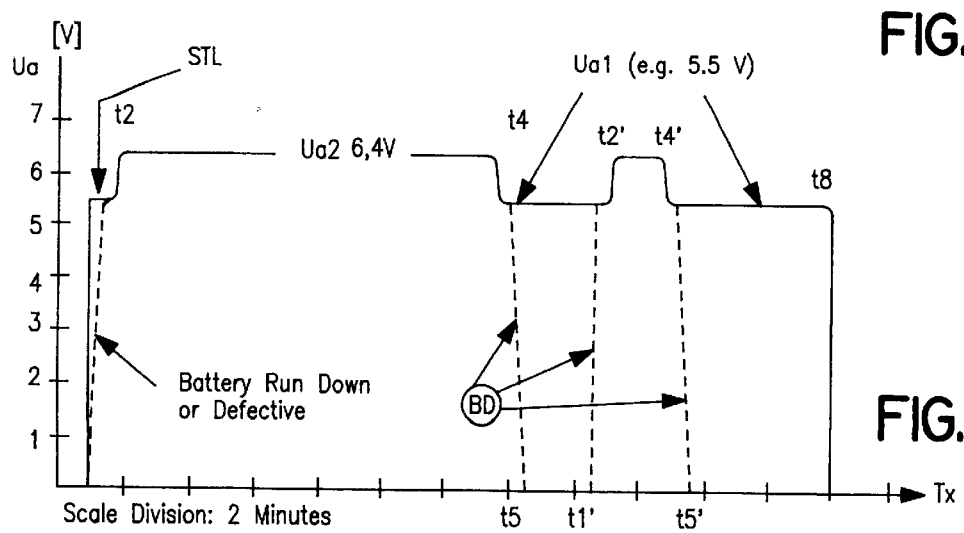

The second threshold-value switch 15 (FIG. 3) is activated at a moment of time t2 by means of the second voltage divider 14 (FIG. 3), i.e. by the component voltage $U_{T2}$ when the voltage $V_x$ exceeds 4.8 V as shown in FIGS. 4a and 4d. When the voltage $V_x$ falls short of 4.5 V at a moment of time t4 as seen by again referring to FIGS. 4a and 4d, the second threshold-value switch 15 is deactivated by the voltage $U_{T2}$ and by means of the second voltage divider 14. During the activation period of the second threshold-value switch 15, the voltage-converting and energy-limiting device 10 (FIG. 3) converts the output voltage $U_{a2}$ to a preferred level of 6.4 V. This occurs as soon as the traveling speed exceeds the range of 5 to 7 kmph (FIGS. 4a and 4e). In the inactive range of the second threshold-value switch 15, i.e. when the traveling speed is lower than 3 kmph, the voltage-converting and energy-limiting device 10 converts the output voltage $U_{a1}$ to 4.5 V up to 6 V, but preferably stabilized and set to, for instance, 5.5 V as shown in FIG. 4e.

Figure 5A:
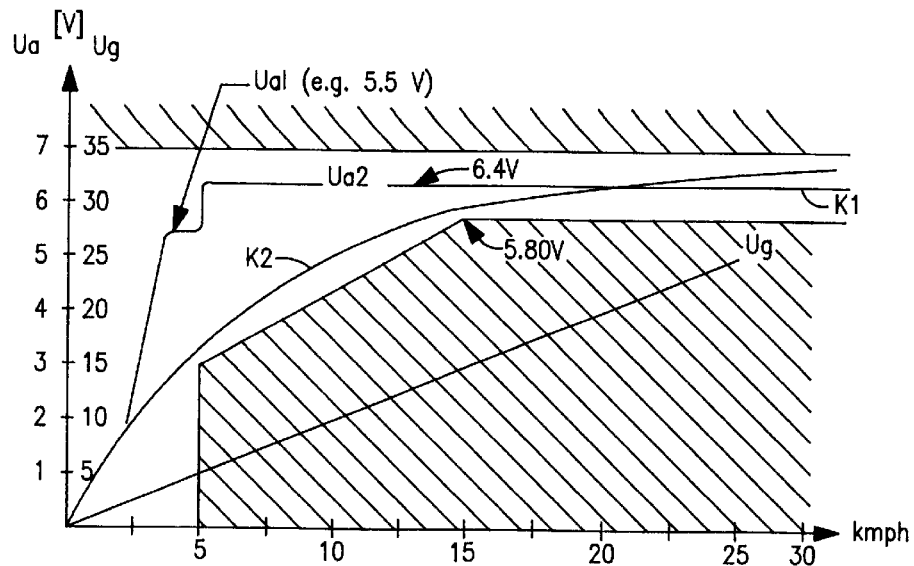
FIGS. 5a, 5b and 5c show voltage/speed diagrams to further explain the function of the inventive dynamo system, whereby

The voltage-speed/time diagram depicted in FIG. 4a and the four voltage/time diagrams depicted in FIGS. 4b to 4e are combined in a voltage/speed diagram illustrated in FIG. 5a. The change-over from $U_a=4.5$ V to $U_a=6.4$ V occurs at a traveling speed of approximately 5 to 7 kmph.

The function/time diagrams illustrated in FIGS. 4a to 4e depict, dependent on and subject to the voltage-speed/ variation-in-time (FIG. 4a), the function of the first threshold-value switch 13 (FIG. 4b), the function of the delay circuit 17 (FIG. 4c), the function of the second threshold-value switch 15 (FIG. 4d) and the function of the output voltage $U_a$, i.e. $U_{a1}$ and $U_{a2}$ (FIG. 4e).

The delay circuit 17 is activated when the threshold voltage $V_x$ falls short of approximately 0.8 V. In other words, the bicycle comes to a stop. The delay circuit 17 now supplies by means of gate circuit $T_1$ and switch $S_1$ the voltage of the battery 4 during a period of four minutes to the circuit node 18 and thus to the voltage-converting and energy-limiting device 10. The latter now produces the output voltage for standstill lighting. At the end of the time interval of four minutes, the switch $S_1$ is opened and the entire system is thereby switched off. In case the first threshold-value switch 13 exceeds the control signal $V_x$, when during the delay interval the voltage $V_x$ is equal to 0.8 V, the delay circuit 17 is set back to zero and there commences the normal traveling program as described hereinbefore under the title "First threshold-value switch 13".

In short, this means that when the bicycle comes to a stop, the standstill or parking light will burn at least four minutes long. Upon starting anew, the lighting system changes over without interruption to the traveling program.

The battery monitoring circuit 19 depicted in FIG. 3 monitors the charge condition of the accumulator battery 4 and the operational capability of the latter. In case the battery is discharged or defective, the battery monitoring circuit 19 will prevent the connection of the accumulator battery 4 to the circuit node 18, so that the system is run and operated according to FIG. 5a directly by the dynamo generator 1 (voltage $U_g$), in such case without bicycle-standstill light, and by the voltage-converting and energy-limiting device 10. It is thereby ensured that such accumulator batteries are protected against total discharge.

Figure 5B:
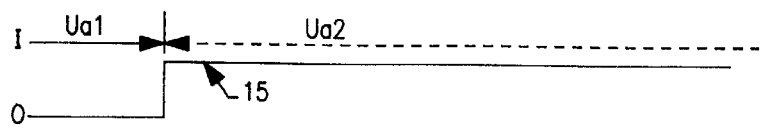
Figure 5C:
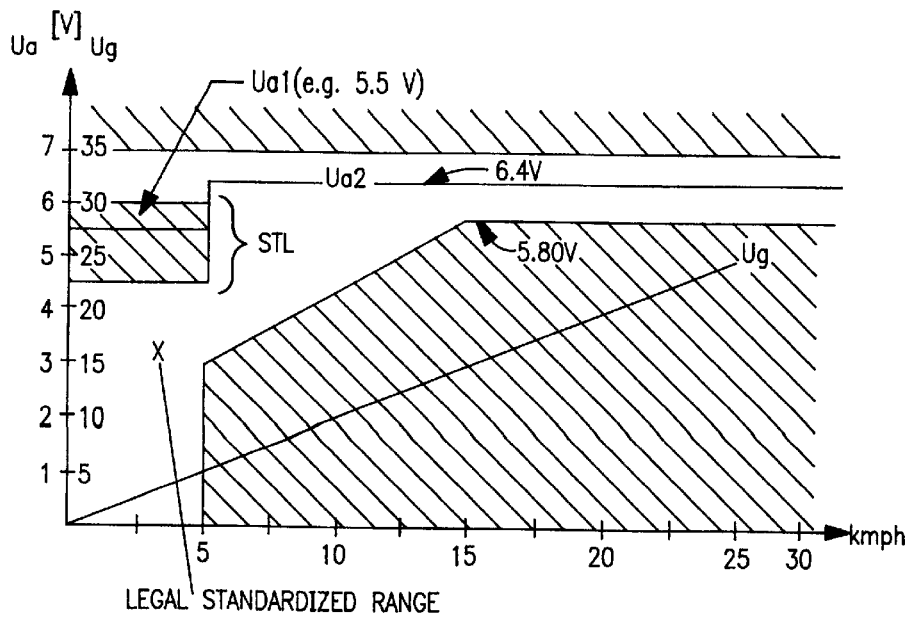

In FIGS. 5a, 5b and 5c there is illustrated the course of the output voltage $U_a$ achieved by the bicycle lighting system constructed in accordance with the invention. The course or progression of such output voltage $U_a$ is depicted in the form of a curve $K_1$ extending between two areas defined by legal Standards and shown in a hatched representation. The course of the output voltage is designated by the reference characters $U_{a1}$ and $U_{a2}$ as will be recognized in FIG. 5b. On the other hand, in FIG. 5a there is depicted a curve $K_2$ showing the course of the output voltage of a conventional bicycle lighting system. The bicycle standstill-light area is conveniently designated by reference character STL in FIG. 5c and extends over a speed range from zero to approximately 5 kmph.

The aforedescribed bicycle lighting system and the dynamo system in accordance with the invention thus have in particular the following advantages:

the dynamo generator 1 disposes of a comparatively very high efficiency which provides a power output of more than 4.5 W at travel speeds of approximately 5 to 7 kmph;

at a travel speed above around 5 kmph, the dynamo generator power is converted to 6.4 V and kept stabilized by means of the converter of the electronic circuitry having a voltage set-up and voltage set-down mode of operation;

this energy is directly available, on the one hand, for rapidly charging the rechargeable accumulator battery and, on the other hand, for producing light;

the electronic circuitry 5 operates already from 2 V with an input voltage starting from 1.5 V and going up to 80 V, whereby the 80 V input voltage would correspond to a speed of approximately 80 kmph;

energy apportioning in travel light and standstill light is thereby rendered possible in ratios of 1–2:1, i.e. one-to-two units travel light and one unit standstill light, irrespective of the travel speed. Such apportioning ratios are currently still rather limited by the charging capacity of rechargeable accumulator batteries. The ratio can be substantially reversed in the case of an improved charging capacity and could be, for instance, a ratio of 1:2. However, such batteries are still not available or have other drawbacks;

the inventive bicycle lighting system meets by far all legal requirements, standards and specifications relating to the dynamo/travel power curve, because constant and adequate energy for lighting as well as battery charging is non-intermittently available;

by virtue of the effected division of the output voltage of the voltage-converting and energy-limiting device 10 of the electronic circuitry 5 to provide, on the one hand, an output voltage of 4.5 V up to 6 V below a speed of around 5 kmph and, on the other hand, a "travel voltage" of 6.4 V, the Standard exacting 3 W for standstill and travel at any speed is perfectly fulfilled;

the battery charging balance is very reliably ensured;

by virtue of the comparatively superior efficiency of the entire inventive bicycle lighting system there is achieved a substantially lower riding resistance. In other words, the cycling or pedaling energy required on the part of the bicycle rider to actuate and drive the dynamo system is substantially reduced in spite of increased dynamo power;

the application of the air-core coil 23 in the generator 1 eliminates magnetic ripple formation;

the dynamo generator 1 has extremely low inductive losses requires no sliding contacts and is, therefore, better and more reliable; and finally the rotary motion of the entire magnetic circuit, i.e. the inner circuit 21 and the outer circuit 22, eliminates the magnetic losses of the dynamo generator 1.

Figure 6:
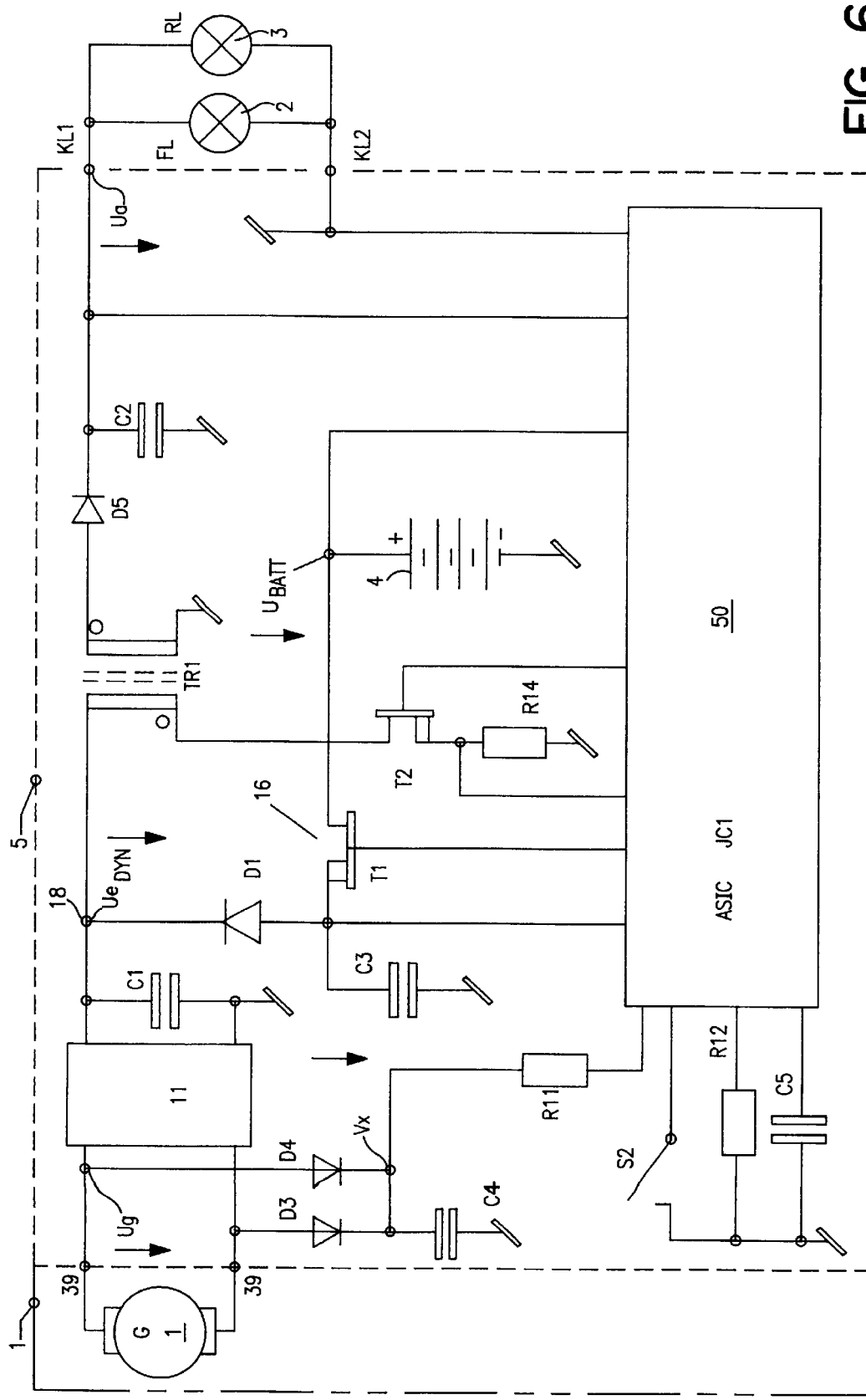
FIG. 6 shows an exemplary accomplished embodiment of the electronic circuitry of the bicycle lighting system constructed according to the present invention and realized by means of a customized, solid-state and integrated switching circuit (ASIC)

FIG. 6 shows an exemplary preferred accomplishment of the electronic circuitry 5 by means of a customized, solid-state, integrated switching circuit 50, at pins of which there are connected external circuit or control elements of the converter circuit.

Since all electronic functions are complex and costly and since the construction, which includes integrated standard switching circuits, would require a large number of components and component parts as well as a great deal of space, there are sensibly and efficiently realized all functions, digital and analog functions, together in a One-Chip-ASIC suitably also designated by reference character 50. A bicycle lighting system being a mass-produced or bulk article, it is evident that mass production of such customized, solid-state and integrated switching circuit 50 is also economically worth-while. The components that cannot be integrated or cannot be sensibly integrated, such as the rectifier 11, the capacitors $C_1$ to $C_4$, a transformer, a power output transistor and further component parts, are connected to the pins of the customized, solid-state and integrated switching circuit 50 in the circuit arrangement illustrated in FIG. 6.

By virtue of the provision of a customized, solid-state, integrated switching circuit 50 for the electronic functions of the electronic circuitry 5, there is rendered possible a very compact and comparatively small electronic circuitry which, together with the accumulator battery 4, can be accommodated in an adequately small housing which is either integrated with the dynamo generator housing or separately mountable thereon.

Figure 7A:
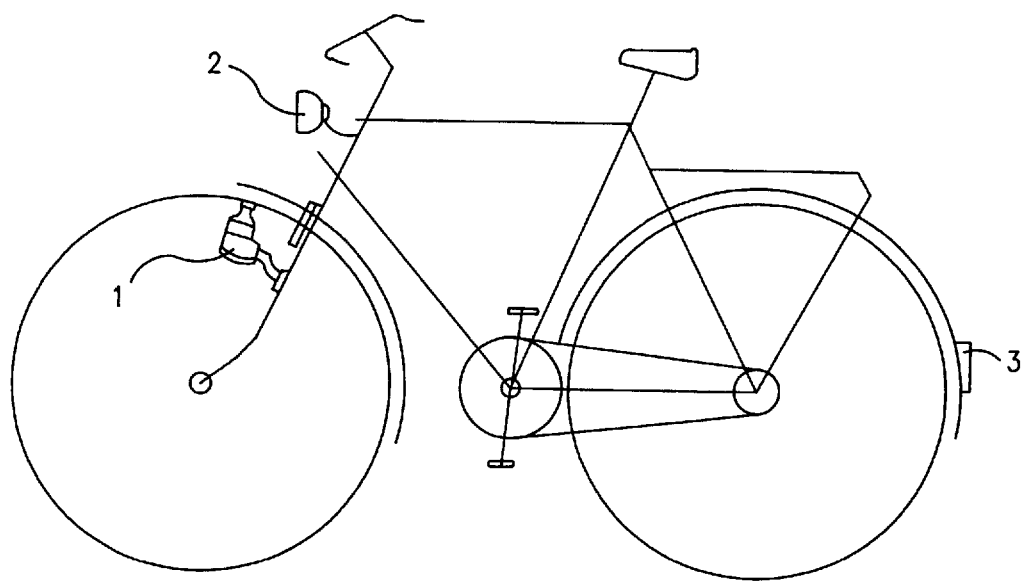
FIG. 7a schematically shows a bicycle incorporating a side dynamo with conventional front and rear lamps.

In FIG. 7a there is schematically illustrated a standard or conventional bicycle provided with the dynamo generator 1 structured as a side dynamo and with a lighting system including a standard front lamp 2 and a standard rear lamp 3. To facilitate the illustration, cables provided to connect the dynamo generator 1 to said standard lamps 2 and 3 are not particularly illustrated. In FIGS. 3 and 6, these lamps 2 and 3, schematically depicted and conveniently also designated by reference characters FL and RL, are fed by the electronic circuitry 5 in a standard specified parallel circuit.

Figure 7B:
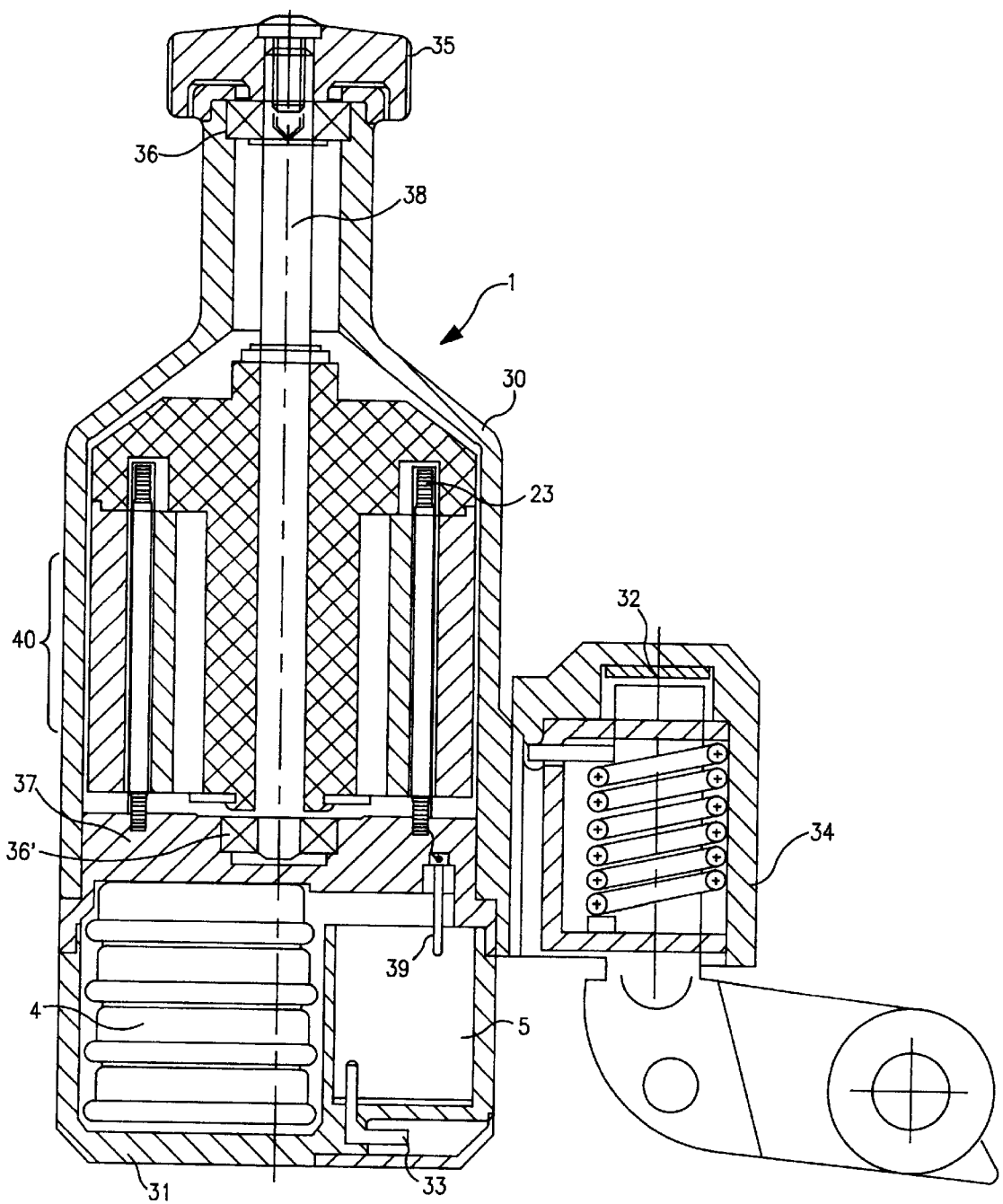
FIG. 7b shows a longitudinal sectional view of a first exemplary embodiment of the dynamo system constructed according to the present invention and structured as a side or laterally mounted dynamo.

FIG. 7b shows a longitudinal sectional view of an exemplary embodiment of the dynamo generator 1 constructed in accordance with the present invention as a side dynamo including the accumulator battery 4 and the electronic circuitry 5. The dynamo system is mounted in known manner on a swivel arm 34 and comprises an upper housing portion 30, which encompasses the rotatable inner and outer circuits 21 and 22 as well as the stationary coil sections 23.1 through 23.6, and a lower housing portion 31 which encompasses the integrated accumulator battery 4 and the integrated electronic circuitry 5, such lower housing portion 31 being fixedly connected to the upper housing portion 30. The coil sections 23.1 through 23.6 are integrally formed with a housing base or bottom 37, and the electronic circuitry 5 is connected by means of guide pins 39 with the coil sections 23.1 through 23.6. Connections or leads 33 to the front lamp 2 and the rear lamp 3 are located in the lower part of the lower housing portion 31.

A sensor 32, designated by reference character $S_2$ in FIGS. 3 and 6, is advantageously accommodated in the housing of the swivel arm 34. Such sensor 32 detects that the complete dynamo system is not ready for operation in the idle position thereof and supplies a signal to the electronic circuitry 5, thereby immediately interrupting the existing or lit standstill or parking lights. In other words, the sensor 32 serves to deenergize the entire bicycle lighting system when the dynamo on the swivel arm 34 is tilted away from the side of a tire or rim of the bicycle. A driving friction wheel 35 for engaging such bicycle tire or rim is fixedly fitted with a dynamo arbor or shaft 38 which, in turn, is connected to the support core 41 of the inner circuit 21. This dynamo shaft 38 is freely rotatably mounted in an upper pivot bearing 36 and a lower pivot bearing 36'.

Although the dynamo system as shown in the longitudinal sectional view in FIG. 7 is constructed as a side or laterally mounted dynamo system, it will be readily clear to those skilled in the art that the aforementioned characteristics of the dynamo system according to the present invention are also applicable for roller-dynamo and hub-dynamo systems.

Figure 8A:
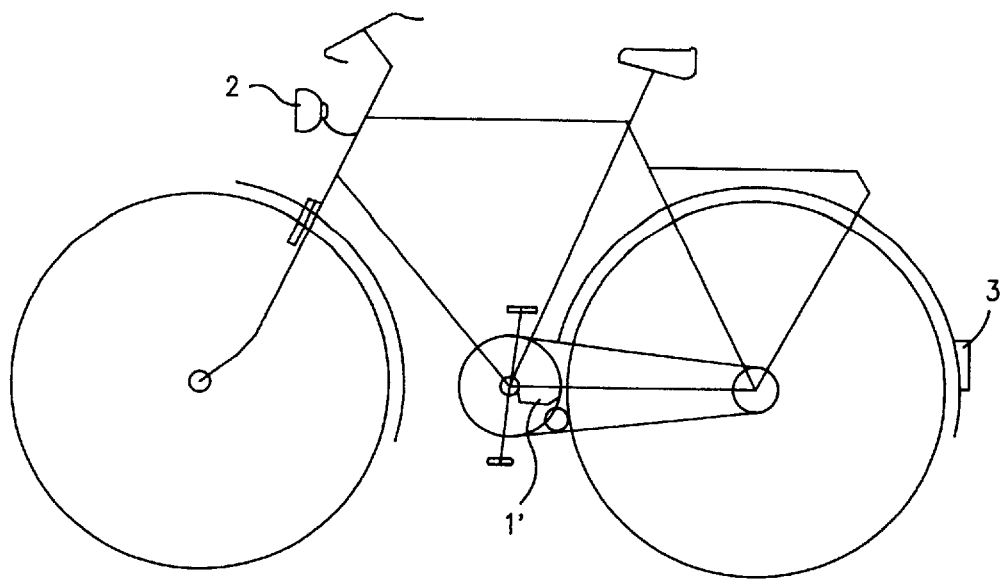
FIG. 8a schematically shows a bicycle incorporating a roller dynamo with conventional lamps.

In FIG. 8a there is schematically illustrated a standard or conventional bicycle provided with the dynamo generator structured as a roller dynamo. The lighting system includes the standard front lamp 2 and the standard rear lamp 3 which are fed by the electronic circuitry 5 in a standard specified parallel circuit as depicted in FIGS. 3 and 6.

Figure 8B:
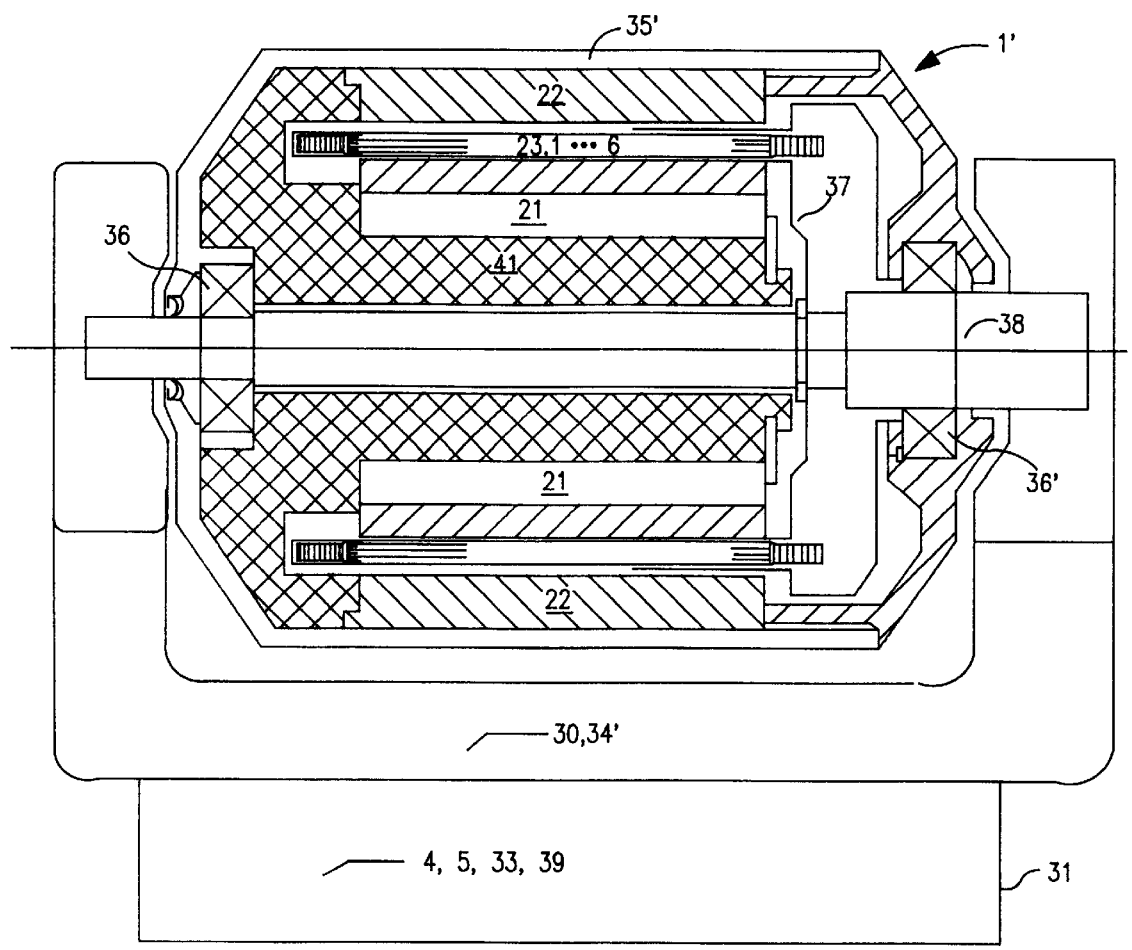
FIG. 8b shows a longitudinal sectional view of a second exemplary embodiment of the dynamo system constructed according to the present invention and structured as a roller dynamo.

FIG. 8b shows a longitudinal sectional view of a second exemplary embodiment of the dynamo generator conveniently designated by reference character 1' and structured as a roller dynamo including the battery 4 and the electronic circuitry 5. The dynamo system is mounted on a bow-shaped swivel arm 34' arranged in front of the rear wheel of the bicycle such that the rotational axis of the dynamo shaft 38 is substantially perpendicular to the plane of the bicycle frame or, in other words, parallel to the axle of said rear wheel.

The swivel arm 34' partially represents the upper housing portion 30 which encompasses the rotatable circuits 21, 22 and the stationary coil sections 23.1 through 23.6. The lower housing portion 31 is fixedly connected to the upper housing portion 30 and encompasses the battery 4 and the electronic circuitry 5. The stationary coil sections 23.1 through 23.6 are integrally formed with the housing base 37.

A driving friction wheel 35' for frontally engaging the tire of the rear bicycle wheel is fixedly mounted on the coaxially rotatable dynamo shaft 38 which is rotatably mounted in the pivot bearings 36 and 36'. The driving friction wheel 35' thereby encases the outer circuit 22 and the inner circuit 21. The dynamo shaft 38 is fixedly coupled to the non-ferrous support core 41 of the inner magnetic circuit 21.

As shown in FIG. 6, it is evidently possible to provide an alternative exemplary embodiment of the dynamo system in that the electronic circuitry 5, the external components or component parts thereof and the battery 4 are kept apart from the dynamo generator 1 and arranged quite separately on the bicycle.

While there are shown and described present preferred embodiments of the invention, it is to be understood that the invention in not limited thereto, but may be otherwise variously embodied and practiced within the scope of the following claims. ACCORDINGLY,

I claim:

1. A bicycle lighting system for pedal-driven vehicles, especially a bicycle, comprising:

a dynamo system to produce electric power;

at least one electric front lamp and at least one electric rear lamp;

said at least one electric front lamp and said at least one electric rear lamp being conventionally mounted on the bicycle, the latter having wheels each comprising a rim and a tire;

said dynamo system being fixedly mounted on the bicycle and having rotatably mounted shaft means fitted with friction means;

said friction means engaging the rim and/or the tire of at least one of said wheels and thereby being rotatably driven when the bicycle is in motion;

said dynamo system comprising a dynamo generator serving to generate an electric power output, a rechargeable accumulator battery for storing electric power, and an electronic circuit comprising a converter for controlling input voltage from said electric power output;

said at least one electric front lamp and said at least one electric rear lamp being supplied with said electric power either from said dynamo generator or from said rechargeable accumulator battery;

the bicycle in motion having a minimum travel speed between approximately 5 to 7 kmph;

said dynamo generator being structured such that starting from said minimum travel speed said electric power output is adequate for rapid charging of said rechargeable accumulator battery and for simultaneously energizing said at least one electric front lamp and said at least one electric rear lamp to maintain a predetermined illumination level;

said dynamo generator accordingly comprising an inner circuit and an outer circuit;

said dynamo generator further comprising a stationary air-core coil comprising coil sections;

said inner circuit and said outer circuit being mounted on said shaft means for synchronous rotation about said stationary air-core coil;

said inner circuit and said outer circuit each comprising n poles in identical pole pitch;

said converter of said electronic circuitry being structured such that said input voltage fed from said dynamo generator is converted into a determinate stabilized output voltage;

said converter accordingly comprising a voltage set-up and voltage set-down mode of operation such that, for said determinate stabilized output voltage, said input voltage may be lesser than, equal to, or greater than said determinate stabilized output voltage; and said input voltage for said converter being additionally provided by said rechargeable accumulator battery as long as said minimum travel speed is not reached.

2. The bicycle lighting system as defined in claim 1, wherein:

said n poles of said inner circuit constitute n inner pole shoes and said n poles of said outer circuit constitute n outer pole shoes; and said n outer pole shoes being substantially oppositely located with respect to said n inner pole shoes.

3. The bicycle lighting system as defined in claim 2, further including:

magnetic poles provided in pairs between said n inner pole shoes;

said n inner pole shoes each comprising two lateral sides; and said pairs of magnetic poles being arranged in such a manner that, in each case, said magnetic poles rest in homopolar configuration against said two lateral sides of each of said n inner pole shoes.

4. The bicycle lighting system as defined in claim 3, wherein:

said n outer pole shoes extend nose-shapedly toward said n inner pole shoes and thereby define, in each case, an air gap between said n inner pole shoes and said n outer pole shoes; and said air gaps each being a shortest possible path for a magnetic flux.

5. The bicycle lighting system as defined in claim 3, wherein:

the provision of said magnetic poles in pairs between said n inner pole shoes entails providing n permanent magnets;

said n permanent magnets being positioned in such a manner that, in each case, said n permanent magnets bear in homopolar configuration against said two lateral sides of each of said n inner pole shoes;

said n inner pole shoes each comprise a mid-portion structured to have a slot extending in a direction substantially radial with respect to said synchronous rotation of said inner circuit together with said outer circuit; and said slots each defining an air gap and thereby reducing mutual interference of said n permanent magnets laterally bearing, in each case, in homopolar configuration against said n inner pole shoes.

6. The bicycle lighting system as defined in claim 5, wherein:

said n permanent magnets each comprise two lateral magnet faces;

lateral surface area of said n permanent magnets laterally bearing against said n inner pole shoes is, in each case, a sum of said two lateral magnet faces;

said n inner pole shoes each comprise a peripheral surface; and said sum of said two lateral magnet faces being substantially larger than said peripheral surface.

7. The bicycle lighting system as defined in claim 1, wherein:

said stationary air-core coil of said dynamo generator comprises an inductance lesser than 150 $\mu$H.

8. The bicycle lighting system as defined in claim 7, wherein:

said stationary air-core coil comprises a coil resistance lesser than 1.5 ohms; and said dynamo generator possesses an internal resistance likewise lesser than 1.5 ohms.

9. The bicycle lighting system as defined in claim 1, wherein:

said stationary air-core coil comprising coil sections forms together with said n inner pole shoes respective pole fields;

said coil sections being divided per pole field into two identical coil sections; and said two identical coil sections per pole field being pole-correctly connected in series.

10. The bicycle lighting system as defined in claim 1, wherein:

said number of poles n represents at least four poles; and said at least four poles being preferably six poles.

11. The bicycle lighting system as defined in claim 1, wherein:

the bicycle in motion has a slow-moving speed range which is even below said minimum travel speed between approximately 5 to 7 kmph;

said slow-moving speed range lying between approximately 3.5 and 5 kmph;

said electric power output at said slow-moving speed range between approximately 3.5 and 5 kmph and under a load of 3 ohms amounts to at least 3 W; and said electric power output at said minimum travel speed between approximately 5 and 7 kmph amounts to at least 4.5 W.

12. The bicycle lighting system as defined in claim 1, wherein:

said generated electric power output of said dynamo generator varies by approximately 0.8 V to 1.2 V per 1 kmph variation in travel speed of the bicycle.

13. The bicycle lighting system as defined in claim 1, wherein:

said dynamo system comprising said dynamo generator, said rechargeable accumulator battery and said electronic circuitry is constructionally realized as a side dynamo.

14. The bicycle lighting system as defined in claim 1, wherein:

said dynamo system comprising said dynamo generator, said rechargeable accumulator battery and said electronic circuitry is constructionally realized as a friction roller dynamo.

15. The bicycle lighting system as defined in claim 1, wherein:

said converter of said electronic circuitry comprises a voltage-converting and energy-limiting device for converting said input voltage into said determinate stabilized output voltage and for limiting converted energy to a determinate maximum energy value;

said electronic circuitry further comprises a threshold-value device and an electronic switchgear;

said electronic circuitry providing a rectified and smoothed dynamo output voltage having a determinate minimum voltage;

said rechargeable accumulator battery providing a battery voltage output; and said threshold-value device being structured to detect said rectified and smoothed dynamo output voltage whereby, in case said threshold-value device detects that said determinate minimum voltage is exceeded, said battery voltage output is fed, in addition to said rectified dynamo output voltage, by means of said electronic switchgear to said voltage-converting and energy-limiting device.

16. The bicycle lighting system as defined in claim 15 wherein:

said determinate stabilized output voltage lies, during battery operation, within a first constant output voltage range and, during dynamo operation, within a second constant output voltage range;

said second constant output voltage range lying above said first constant output voltage range;

said electronic circuitry comprises a battery charging device;

said battery charging device having a determinate charging output voltage above which said battery charging device is activated; and said determinate charging output voltage lying between said first constant output voltage range and said second constant output voltage range.

17. The bicycle lighting system as defined in claim 16, wherein:

said first constant output voltage range of said electronic circuitry lies in a range from 4 V to 6 V, but preferably from 4.5 V to 5 V; and said determinate charging output voltage is preferably 6.1 V.

18. The bicycle lighting system as defined in claim 16, wherein:

said voltage-converting and energy-limiting device limits said electric power output of said electronic circuitry invariably between 4 W and 6 W, preferably invariably between 4.5 W and 5 W.

19. The bicycle lighting system as defined in claim 16, wherein:

said electronic circuitry further comprises:

a rectifier circuit for producing said rectified and smoothed dynamo output voltage which is supplied to said voltage-converting and energy-limiting device;

a first voltage divider network for converting a first rectified and smoothed output voltage of said dynamo generator, said output voltage being proportional to the travel speed, into a first component voltage, and for supplying this first component voltage to a first threshold-value switch of said threshold-value device;

a second voltage divider network for converting said rectified and smoothed output voltage of said dynamo generator, said output voltage being proportional to the travel speed, into a second component voltage, and for supplying this second component voltage to a second threshold-value switch of said threshold-value device;

said first threshold-value switch feeding said battery voltage output to said voltage-converting and energy-limiting device by means of said electronic switchgear when said rectified and smoothed dynamo output voltage exceeds a first threshold voltage detected by said first threshold-value switch, said first threshold voltage corresponding with said determinate minimum voltage; and said second threshold-value switch supplying to said voltage-converting and energy-limiting device a signal to switch over said output voltage of said voltage-converting and energy-limiting device from said first constant output voltage range to said second constant output voltage range and vice versa, whenever said second threshold-value switch detects that said second threshold voltage is exceeded or no longer exceeded, respectively.

20. The bicycle lighting system as defined in claim 19, wherein:

said electronic circuitry comprises a delay circuit connected to an output of said first threshold-value switch and to said electronic switchgear;

a time delay of said delay circuit defining a predetermined period of time;

said delay circuit being activated when said rectified and smoothed dynamo output voltage falls short of said first threshold voltage, and thereby opening said electronic switchgear to supply said battery voltage output to said voltage-converting and energy-limiting device;

said voltage-converting and energy-limiting device thereby producing output voltage which, in case of zero travel speed, provides standstill lighting during said predetermined period of time;

said electronic switchgear switching off said battery voltage output from the input of said voltage-converting and energy-limiting device at the end of said predetermined period of time;

said battery charging device of said electronic circuitry is provided with an output side coupled to said voltage-converting and energy-limiting device; and said battery charging device remaining, also in the case of battery operation, activated for charging said rechargeable accumulator battery.

21. The bicycle lighting system as defined in claim 20, wherein:

said dynamo generator is provided with sensor means for detecting that said dynamo generator in an idle position thereof is not ready for operation;

said sensor means thereby transmitting to said electronic circuitry a signal to put out said standstill lighting if existing; and said idle position being brought about by tilting away said dynamo generator from engaging said rim and/or said tire of at least one of said bicycle wheels.

22. The bicycle lighting system as defined in claim 19, wherein:

said electronic circuitry comprises a customized, solid-state and integrated switching circuit.

23. The bicycle lighting system as defined in claim 1, further including:

a housing located apart from said dynamo generator; and said electronic circuitry together with said rechargeable accumulator battery being arranged in said housing.

24. The bicycle lighting system as defined in claim 1, further including:

a housing provided for said electronic circuitry together with said rechargeable accumulator battery;

said dynamo generator being accommodated in a dynamo housing; and said housing being mounted on said dynamo housing.

25. The bicycle lighting system as defined in claim 1, further including:

a two-parted housing to accommodate said electronic circuitry and said rechargeable accumulator battery together with said dynamo generator.

26. A generator, comprising:

an inner circuit and an outer circuit;

a stationary air-core coil comprising coil sections;

said inner circuit and said outer circuit being rotatably mounted for synchronous rotation about said stationary air-core coil;

said inner circuit comprising n inner pole shoes in identical pole pitch;

said outer circuit comprising n outer pole shoes in identical pole pitch;

said n outer pole shoes being substantially oppositely located with respect to said n inner pole shoes;

n magnets respectively provided between said n inner pole shoes in said identical pole pitch;

said n inner pole shoes each comprising two lateral sides;

said n magnets being positioned in such a manner that, in each case, said n magnets rest in homopolar configuration against said two lateral sides of each of said n inner pole shoes;

said n outer pole shoes being structured to extend nose-shapedly toward said n inner pole shoes and thereby define, in each case, an air gap between said n outer pole shoes and said n inner pole shoes; and said air gaps being in each case a shortest possible path for a magnetic flux.

27. The generator as defined in claim 26, wherein:

said n inner pole shoes each comprise a mid-portion structured to have a slot extending in a direction which is substantially radial with respect to said synchronous rotation of said inner circuit together with said outer circuit; and said slots each defining an air gap in order to reduce mutual interference of said n magnets laterally bearing in each case in homopolar configuration against said n inner pole shoes.

28. The generator as defined in claim 27, wherein:

said n magnets each comprise two lateral magnet faces;

surface area of said n magnets laterally bearing against said n inner pole shoes is, in each case, a sum of said two lateral magnet faces;

said n inner pole shoes each comprise a peripheral surface; and said sum of said two lateral magnet faces being substantially larger than said peripheral surface.

29. The generator as defined in claim 26, wherein:

said stationary air-core coil comprising coil sections constitutes with said n inner pole shoes respective pole fields;

said coil sections being divided per pole field into two identical coil sections; and said two identical coil sections per pole field being pole-correctly connected in series.

30. The generator as defined in claim 26, wherein:

said number n defining the number of inner pole shoes, outer pole shoes and magnets represents an even number; and said n magnets are preferably structured as n permanent magnets.

\* \* \* \* \*

UNITED STATES PATENT AND TRADEMARK OFFICE
CERTIFICATE OF CORRECTION

PATENT NO. : 5,857,762
DATED : Jan. 12, 1999
INVENTOR(S) : Schwaller

It is certified that error appears in the above-identified patent and that said Letters Patent is hereby corrected as shown below:

On the title page, insert

-- [56]     References Cited

U.S. PATENT DOCUMENTS 5,584,561   12/1996   Lahos ..................... 362/192 --

Signed and Sealed this

Thirteenth Day of July, 1999

*Attest:*

Q. TODD DICKINSON

*Attesting Officer*     Acting Commissioner of Patents and Trademarks